United States Patent
Sohraby (12)

(10) Patent No.: US 6,192,049 B1
(45) Date of Patent: Feb. 20, 2001

(54) JITTERLESS AND LOSSLESS SWITCHING FABRIC WITH NETWORK ROUTING

(75) Inventor: Kazem A. Sohraby, Lincroft, NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 08/900,373

(22) Filed: Jul. 15, 1997

(51) Int. Cl.$^7$ .................................................. H04L 12/28
(52) U.S. Cl. ........................................... 370/389; 370/395
(58) Field of Search .................................... 370/389, 395, 370/396, 398, 399, 468, 474, 477, 400, 401, 537, 539

(56) References Cited

U.S. PATENT DOCUMENTS

| 5,390,175 | * | 2/1995 | Hiller | 370/398 |
| 5,724,352 | * | 3/1998 | Cloonan | 370/395 |
| 5,805,568 | * | 9/1998 | Shinbashi | 370/397 |
| 5,867,502 | * | 2/1999 | Chang | 370/477 |

* cited by examiner

*Primary Examiner*—Douglas W. Olms
*Assistant Examiner*—Ricardo M. Pizarro
(74) *Attorney, Agent, or Firm*—Gibbons, Del Deo, Dolan, Griffinger & Vecchione

(57) ABSTRACT

A switching fabric has input ports, output ports, buffers and at least one switch processor, which determines the available capacity of links at a switch and communicates this information to other switches in a network on a periodic basis. Based on this knowledge, the switch processor of the present invention determines if the necessary number of contiguous time slots in a time frame are available for the call in question. The routing method of the present method uses the periodically updated bandwidth usage to determine a route from a source switch to a destination switch. By utilizing periodic updates of bandwidth usage and assigning contiguous time slots, time slot availability becomes predictable and cell streams travel jointly along the same route, which in turn eliminates cell loss and jitter.

36 Claims, 5 Drawing Sheets

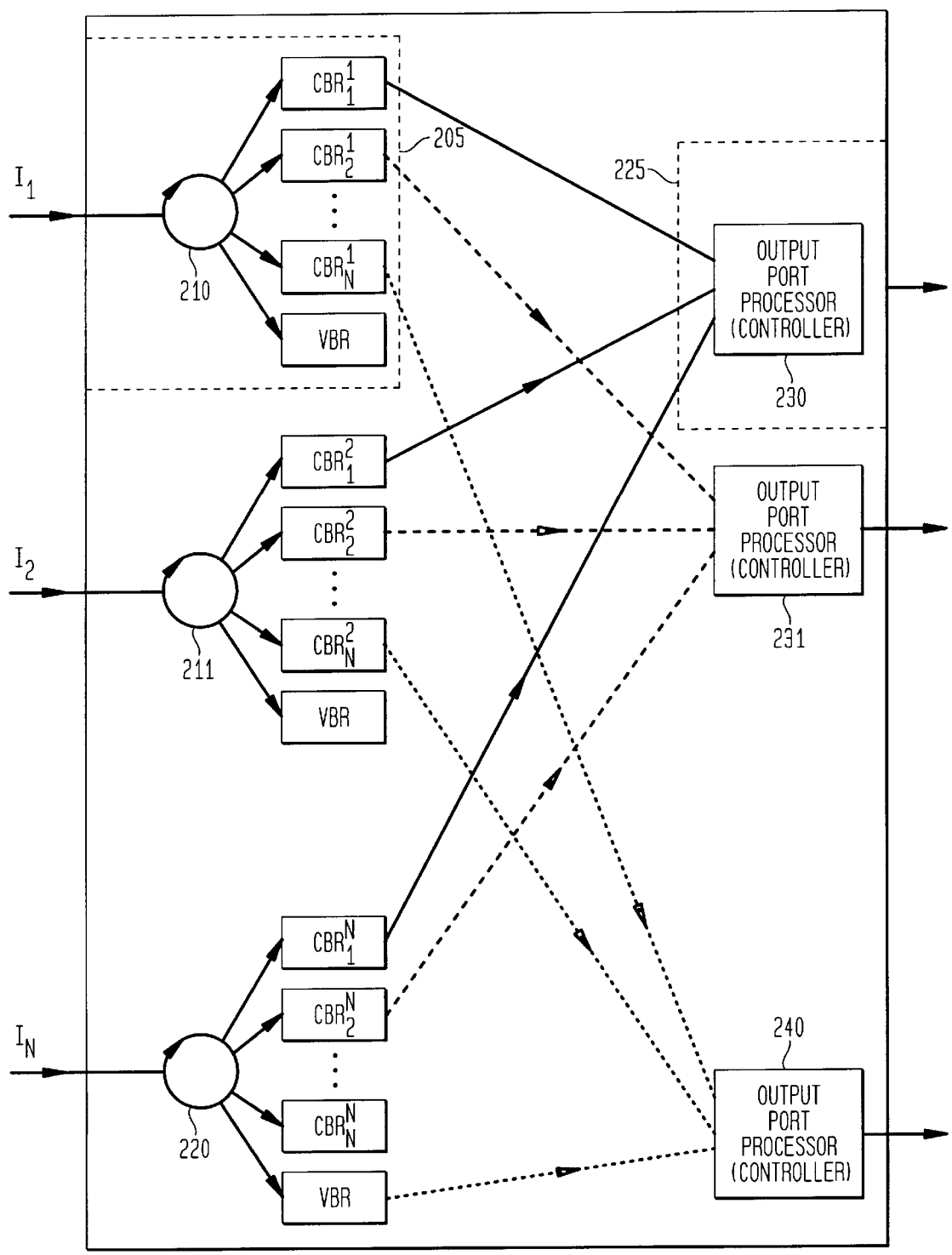

JITTERLESS AND LOSSLESS SWITCHING FABRIC WITH NETWORK ROUTING

FIELD OF THE INVENTION

This invention relates to the field of communications and in particular, to switching fabrics used in packet data communications.

BACKGROUND OF THE INVENTION

Asynchronous Transfer Mode ("ATM") is a networking technique designed to support high speed digital voice, data and video communications. It is generally believed that within the next several years, most of the voice, data, and video traffic generated throughout the world will be transmitted by ATM technology. Broadband packet networks based on ATM technology are enabling the integration of traffic having a wide range of characteristics within a single communications network.

These networks are typically comprised of switches, which are coupled to each other, and to communicating devices, by links. Each link is characterized by a bandwidth or link capacity. Information input from the communication devices to the network may be of any form but is often formatted into fixed-length packets, called "cells" in ATM terminology. When information is to be exchanged between two communications devices, a path is established within the network connecting the switches (hereafter called the origination and destination switches) with which those devices are associated. Routing of cells is thus accomplished through the switches over the links set up between the source and destination switches.

In these networks, a given communications stream between a specified origin and destination is carried over a set of physical paths (e.g., paths comprising the origin and destination switches, possibly one or more intermediate switches, and links connecting the included switches) within the network. The set of origin-to-destination paths, wherein each path is characterized by a predetermined bandwidth, are generally referred to as virtual paths. It will also be the case that several such virtual paths may co-exist along all or some part of a physical path within a network. Although typically a number of different physical paths could be chosen initially to constitute such a virtual path, once the virtual path is established, the chosen physical paths generally remain established for the given communications session.

The ATM networking protocol is capable of handling multiple classes of traffic (i.e., the communication streams) ranging from real-time video to best-effort traffic requiring no Quality of Service guarantees. An industry group, the ATM Forum, has defined a family of service categories to address these classes of traffic, specifically, Constant Bit Rate ("CBR") service, and Variable Bit Rate ("VBR") service (which includes Unspecified Bit Rate ("UBR") service and Available Bit Rate ("ABR") service). However, several problems arise in the switching and transmitting of CBR traffic, namely, cell loss and jitter. Note that many types of VBR service, e.g., UBR and ABR, can be multiplexed to produce CBR streams with a certain quality of service for maximally utilizing the link bandwidth. As such, the above noted problems are equally applicable.

Cell loss occurs when the receiving switch cannot process the cells at the rate of delivery. One prior art method for handling this problem is to provide sufficient memory buffers at strategic locations within the switching fabric to accommodate the incoming cells. A drawback of this prior art methodology is that if the number of cells exceed the memory buffer capacity, then the cell or cells are discarded, thus either forcing the receiving switch to request retransmission of that cell(s) or causing degradation in the communication. Discarding cells in this manner is an ineffective use of network resources and decreases the overall throughput of the network. Some prior art methods use potentially large memory buffers to try to prevent cell loss.

Jitter occurs when related cells arriving through different paths experience different delays. That is, temporal delays resulting from contention among the cells and the random arrival of the cells from different switches, gives rise to variations in cell spacing. This is particularly disruptive to real time communications (e.g., audio communications, because it can cause audible pops and clicks). Some prior art methods for reducing jitter provide large buildout delays at the destination switch. A disadvantage of this method is that the amount of buffering required to accomplish this may be quite large and buffer management could become quite complex.

Accordingly, there is a need to provide a simple and effective switching fabric which provides jitterless and lossless switching in packet-based networks.

SUMMARY OF THE INVENTION

The present invention teaches a switching fabric integrated with a routing method which eliminates cell loss and jitter by utilizing periodically updated link available bandwidth information to verify capacity and to provision available contiguous time slots between source and destination switches for constant bit rate transmission in an ATM network. The present invention can also accommodate variable bit rate traffic. By separating input and output side functionality, the structure of the present invention is modular and adjustable in terms of the number of input ports, output ports and in the speed of the traffic. Importantly, the present invention is implementable in existing networks and with future networks to increase overall network speed and reliability.

In an exemplary embodiment of the present invention, a switching fabric is comprised of input units, output units, buffers and a switch processor(s). The switch processor determines the available capacity of a link at a switch and communicates this information to other switches in the network on a periodic basis. In response to a call request, the switch processor determines if the necessary number of contiguous time slots are available to handle the call based on the relatively fresh bandwidth usage values. If the time slots are available, the routing method of the present invention determines a route from a source switch to a destination switch based on the periodically updated bandwidth usage. Cell loss and jitter are eliminated since the periodic updates of bandwidth usage and the assignment of contiguous time slots result in predictable time slot availability and permit cell streams to travel jointly along the same route.

Advantageously, the switching fabric of the present invention eliminates complex and lengthy addressing issues by allocating contiguous time slots to the communication streams. By provisioning contiguous time slots to the communication streams, the switch processor has to note the number of time slots or point to the boundary of a group of contiguous time slots in a frame, in order to route the cells to the proper output port. Non-constant bit rate streams are processed by the present invention in view of time slot allocation and bandwidth usage for constant bit rate streams. Importantly, the switching fabric of the present invention accounts for all types of communication streams.

The above factors make the present invention switching fabric a simple and reliable structure for increasing network speed. Such a switching fabric can play an important part in utilizing and developing greater bandwidth, and obtaining networks with predictable performance.

BRIEF DESCRIPTION OF THE DRAWINGS

A more complete understanding of the present invention may be obtained from consideration of the following description in conjunction with the drawings in which:

FIG. 2 is an exemplary embodiment of a switching fabric in accordance with the present invention;

DETAILED DESCRIPTION

The present invention is a device and method which provide substantially jitterless and lossless switching by utilizing periodically updated link bandwidth usage to verify capacity and to provision available contiguous time slots between source and destination switches in response to a constant bit rate call request. The above eliminates cell loss and jitter since time slot availability becomes predictable and cell streams travel jointly along the same route.

In general, a network is comprised of multiple switches. In accordance with the present invention, each switch has a switching fabric which is comprised of input units, output units, buffers and a switch processor(s). The switch processor determines the available capacity of a link at a switch and communicates this information to other switches in the network on a periodic basis. This permits the switch processor to determine, in response to a call request, if the necessary number of contiguous time slots to accommadate the CBR call are available to handle the call on the freshest available capacity data. If the time slots are available, the routing method of the present invention determines a route from a source switch to a destination switch.

Although the present invention provides jitterless and lossless switching for constant bit rate ("CBR") traffic, the present invention accommodates variable bit rate ("VBR") traffic. That is, the present invention does not switch VBR traffic in the same jitterless and lossless manner as it does CBR traffic. Note, however, that many types of VBR traffic, e.g., available bit rate and unspecified bit rate traffic, are multiplexed to produce relatively smooth traffic similar to CBR with pre-specified cell loss and jitter. Under these conditions, the present invention is equally applicable and beneficial for VBR traffic as well. In particular, if the CBR or VBR traffic or data streams have the same virtual channel or virtual path identifiers, then it is preferable to combine the streams for efficient processing. VBR traffic which is not multiplexed, is also supported by the switching fabric of the present invention but not in a lossless or jitterless manner.

Although CBR and VBR traffic is handled together by most switching fabrics, it is preferable to handle each type separately, as detailed below.

Figure 1:
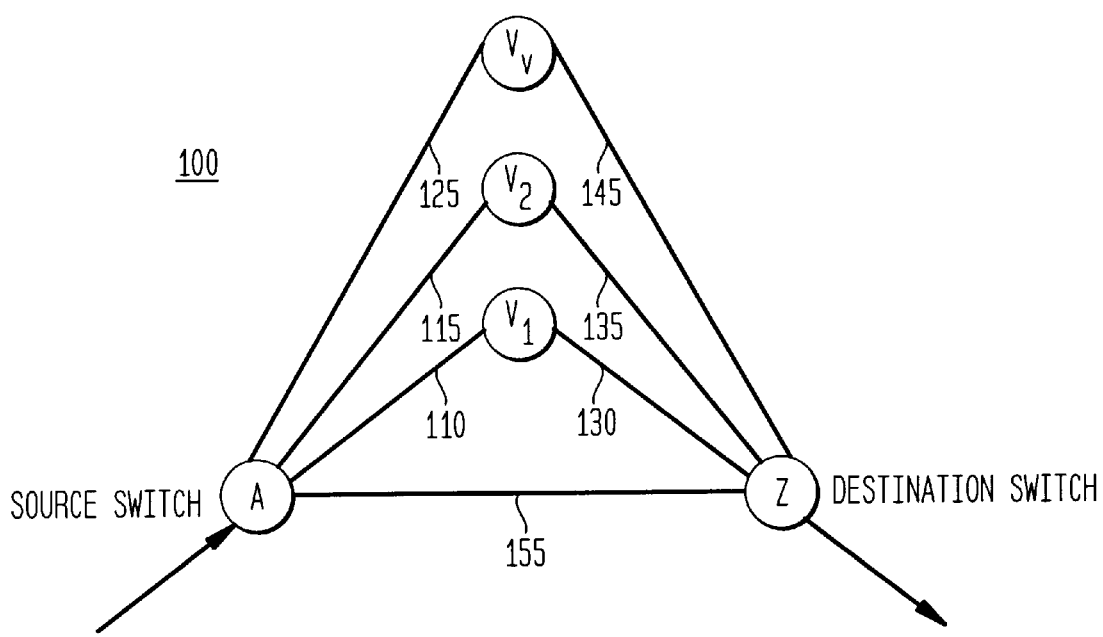
FIG. 1 is a schematic illustration of a typical network with a source switch, intermediate switches and a destination switch.

Referring to FIG. 1, there is illustrated a schematic diagram of a network 100 over which a user communicates with other users. Network 100 has a source switch A, a destination switch Z and a set of intermediate switches $V_1$, $V_2$ to $V_N$. Each of the switches $V_1$, $V_2$ to $V_N$ represents either one intermediate switch or a series of intermediate switches in network 100. Network 100 further includes a set of links 110, 115 and 125 between switch A and switches $V_1$, $V_2$ to $V_N$, a set of links 130, 135 and 145 between switches $V_1$, $V_2$ to $V_N$ and switch Z, a link 155 directly between switch A and switch Z. Network 100 and links 110 through 155 represents any network and links which support packet-based transmission of information and data, for example, Synchronous Optical Networks ("SONET")/Synchronous Digital Hierarchy ("SDH"). As would be understood, in ATM networks, sessions carried on links 110 through 155 are represented by virtual channels and/or virtual paths. Routing is established using the address information contained in the cell header, which identifies the desired link, and are termed, virtual channel identifiers ("VCI") and virtual path identifiers ("VPI").

Referring now to FIG. 2, a switching fabric 200 is illustrated in accordance with the present invention. Switching fabric 200, for example, is utilized in each of the switches A, $V_1$, $V_2$ to $V_N$ and Z as shown in FIG. 1. In an exemplary embodiment of the present invention, switching fabric 200 consists of input ports $I_1$, $I_2$ to $I_N$, an add/drop multiplexer 210, 211 to 220 coupled with each input port, and a set of buffers $CBR_1$, $CBR_2$ to $CBR_N$, and VBR coupled to each add/drop multiplexer 210, 211 to 220. On an output side, switching fabric 200 consists of output ports $O_1$, $O_2$ to $O_N$ and an associated output port processor or controller 230, 231 to 240. As is evident from FIG. 2, the number of buffers $CBR_1$, $CBR_2$ to $CBR_N$ at each input port are equal to the number of output ports $O_1$, $O_2$ to $O_N$. The functionality of switching fabric 200 is separated with respect to input side functionality 205 and output side functionality 225. As a consequence, the structure of the present invention is modular in terms of the number of input ports, output ports, and buffers, making it easily expandable to handle any number of potential connections. As shown in more detail below, the above structure permits switching fabric 200 to accommodate various traffic speeds by changing the speed of the add/drop multiplexers and the size of the buffers. As such, switching fabric 200 is compatible with existing networks and usable with future network architectures.

Figure 3A:
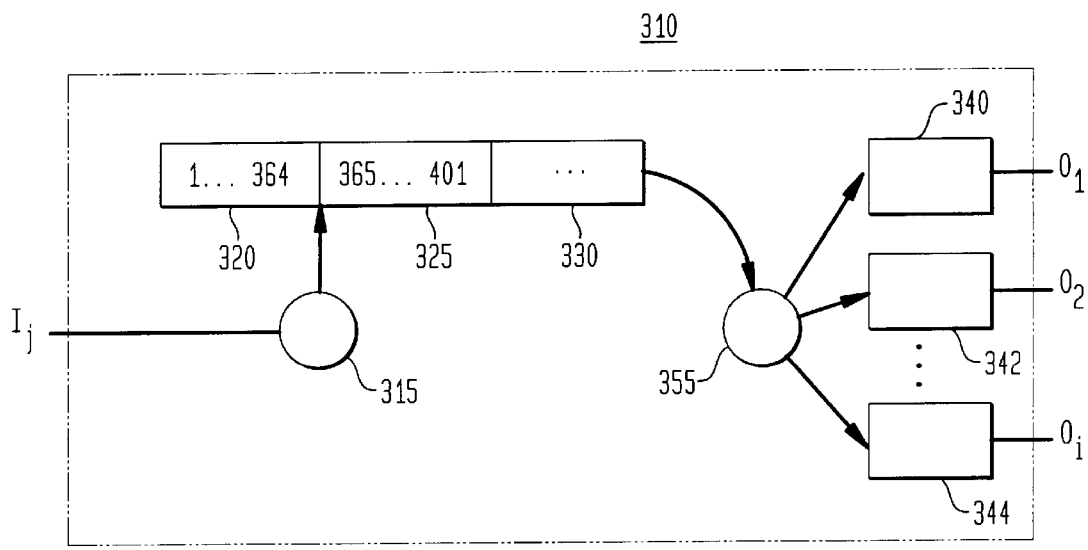
FIGS. 3A and 3B are functional diagrams of an input port processor and an output port processor in accordance with the present invention.
Figure 3B:
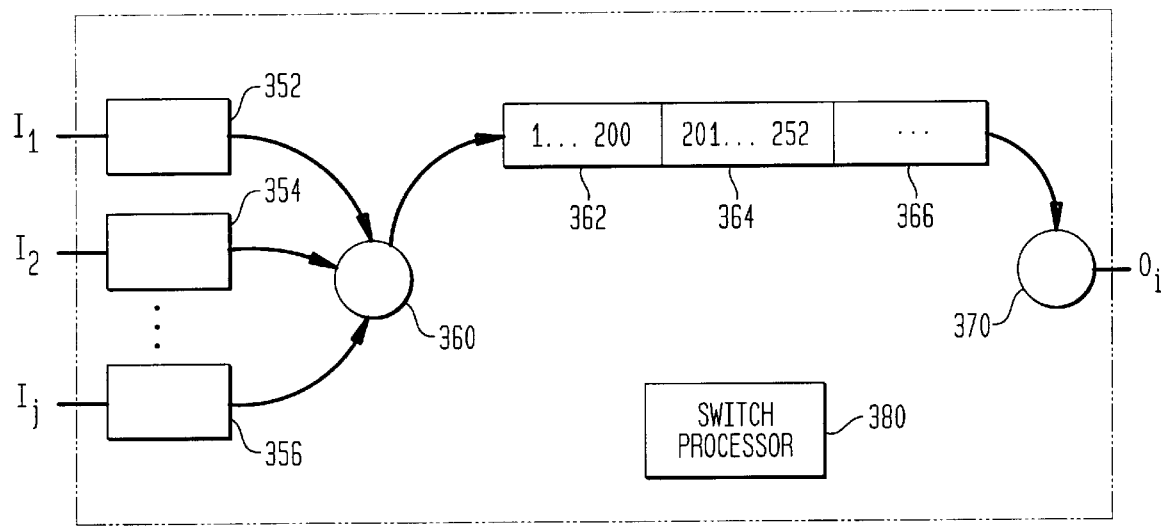

Referring now to FIGS. 3A and 3B, a functional diagram is shown of an input unit 310 and an output unit 350, which corresponds to the input side functionality 205 and output side functionality 225 shown above in FIG. 2. Referring specifically to FIG. 3A, input unit 310 includes a data input controller 315 for transferring data, which corresponds to a group of contiguous time slots arriving at input port $I_j$, to data input buffers 320, 325 and 330. A data controller 335 then transfers the data to the designated output buffers 340, 342, and 344, each output buffer corresponding to an output port. The transfer operations performed by data input controller 315 and data controller 335 may occur simultaneously and represents the operation of a drop multiplexer. Referring now specifically to FIG. 3B, an output unit 350 includes a data output controller 360 for transferring data from different input ports 352, 354 and 356 to output buffers 362, 364 and 366. Output controller 370 transfers the data from the latter set of buffers to output port $O_i$. The transfer operations performed by data output controller 360 and output controller 370 represents an "add" multiplexer. As a consequence, in the exemplary embodiment shown in FIG. 2, add/drop multiplexers are utilized for the transfer of data. As would be evident, the speed of the add/drop multiplexers are chosen to match the speed of the input/output transport medium, thus permitting implementation of the present invention in present and future networks.

Referring still to FIG. 3B, output unit 350 also includes a switch processor 380, which determines and updates the capacity information and implements the routing decisions reached by the routing method of the present invention. This is also referred to as output port processor 230, 231 and 240 in the exemplary embodiment shown in FIG. 2. In general, switches maintain and determine routing information either by utilizing a centralized approach where each switch requests the required information from a central processor or by exchanging routing information with the desired switches during the call set-up phase. In an exemplary embodiment of the present invention, switch processor 380 performs capacity verification by checking periodically updated link bandwidth usage and routing tables of the available bandwidth at each neighboring switch that is utilized in routing a call. As shown below, the periodic exchange of capacity information and the handling of CBR and VBR call requests separately, permits switch processor 380 to assign a contiguous set of time slots to the call request.

As stated above, the present invention handles each call request type separately. This permits switch processor 380 to determine the bandwidth being utilized by each call and thus the total bandwidth being utilized in each link. This is possible since CBR traffic uses fixed bandwidths and VBR traffic is bounded by peak rate and minimum bandwidth values. The ATM Forum uses the terms, Peak Cell Rate and Minimum Cell Rate, to describe the above characteristics of VBR traffic, respectively. Currently state of the art switches handle CBR and VBR traffic in a mixed manner and can only estimate the bandwidth being used.

Moreover, current systems only exchange routing information at call set-up time. As such, the switches have to obtain routing information before deciding on whether to accept or reject the call. In the present invention, switch processor 380 utilizes up-to-date available bandwidth information to accept or reject decision. This results in a quicker and more efficient decision making approach. The "freshness" of the available bandwidth information depends upon the periodicity of the updates. In current networks, after a call is established, it is disconnected after a designated call holding time. As such, the periodicity of the updates in the present invention are selected such that it is comparable and preferably shorter, than the shortest call holding times. In an exemplary embodiment, given current call holding times, the periodicity of the updates are, for example, in the range of 1–10 seconds. In a preferred embodiment, the periodicity is 1 second.

In the exemplary embodiment of the present invention, switch processor 380 utilizes signaling and special messages for exchanging the routing and capacity information among the neighboring switches. The exchanging of information occurs during the call set up phase, in conjunction with the messages that are exchanged to establish a call route from source switch A to destination switch Z. Exchanges are also performed during the actual call time so as to re-route calls in a more efficient manner. The task of exchanging the messages containing the available link bandwidth for each switch is implementable in several ways, including synchronously, asynchronously, in a centralized manner or in a distributed manner.

Figure 4:
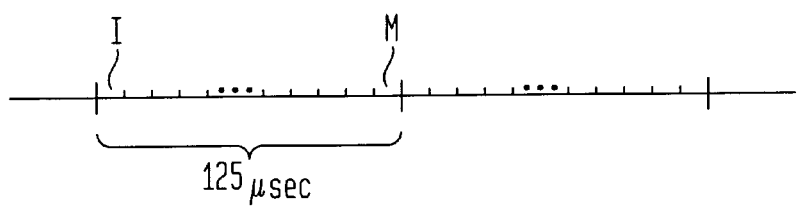
FIG. 4 is an illustration of a preferred communication time frame utilized in the present invention, where the preferred time frame is a 125 μsec time frame.

Given the above structure, the exemplary embodiment of the present invention processes information based on 125 $\mu$sec time frames. This is a useful parameter in voice communications, as it corresponds to the sampling rate utilized when digitizing a voice conversation using Pulse Code Modulation. Referring to FIG. 4, a 125 $\mu$sec time frame is illustrated having M time slots. For example, if M is equal to 24, it would represent a T1 digital transmission link. More specifically, the switching fabric achieves switching of CBR bursts in 125 $\mu$sec time frames, where a CBR burst is defined as the number of contiguous time slots required in the 125 $\mu$sec time frame for the CBR stream in question. As shown below, there are decidedly advantageous reasons for processing CBR streams in his manner, for example, the elimination of jitter.

By switching CBR bursts in 125 $\mu$sec time frames, the buffer size is predictable because CBR traffic is normally received in 125 $\mu$sec time frames from exemplary networks, such as SONET/SDH. The buffer size required is dependent upon the speed of the transport medium and is therefore easily computed. Given a capacity C bps and a cell size of L bits per cell (where L=53*8=424 bits per cell in the current ATM networks), the largest CBR buffer, M, at a port is:

$$M = \frac{C(Mbps) * 125(\mu \sec)}{L(\text{bits per cell})}$$

For a SONET STS-1C rate of approximately 51 Mbps, M is approximately 16 cells. Due to this switching procedure, cell contention cannot occur for CBR calls and cell loss is eliminated. For example, in the exemplary embodiment shown in FIG. 3A, if buffers 340, 342 and 344 are fast read/write memory devices with the memory size corresponding to the number of time slots for a 125 $\mu$sec time frame, then the contents of the buffers 320, 325 and 330 are transferable to the first mentioned buffers without cell loss.

As mentioned above, there are several advantages to using contiguous time slots for CBR calls. Once a route is established between source and destination switches, and contiguous time slots are provisioned at each switch for the CBR call, then the CBR streams for a given time frame will all travel along the same route. This eliminates the jitter problem associated with traveling along different paths or being interspersed by transmission from other sources when in transit, to reach the same destination. A further advantage is that internal routing is simplified, which results in increased overall network speed. In the present invention, internal routing for a particular CBR burst at the input port is achieved by noting which contiguous time slots in the time frame are allocated to the call at call set up time, noting the output port and establishing a table which cross-references the contiguous time slots to the desired output port. For example, referring to FIG. 3A and Table 1, time slots 1–364 are eventually transferred contiguously to output port 1 and time slots 365–401 to output port i. In an alternative embodiment, addressing is accomplished by pointing to the boundary of a group of contiguous time slots in a frame. As before, this is less complex than examining VPI or VCI identifications in each cell.

TABLE 1

Internal Routing

| CONNECTION | FIRST SLOT # | LAST SLOT # | OUTPUT PORT |
|---|---|---|---|
| 1 | 1 | 364 | 1 |
| 2 | 365 | 401 | i |

As noted above, the above process simplifies internal routing. Instead of examining the individual VPI or VCI of each cell, the switching fabric of the present invention notes which contiguous time slots used to accommodate the CBR burst. As would be evident, counting the number of time slots and noting either the first or last time slot being used by the particular call is much faster than reading the VPI or VCI and looking up a routing table, for each cell in the CBR burst. This method is especially useful if at the source switch, all CBR streams are combined into one virtual path (as long as they fit into the 125 μsec time frames). The switch then only has to process the virtual path and not the individual virtual connections comprising the virtual path.

Figure 5:
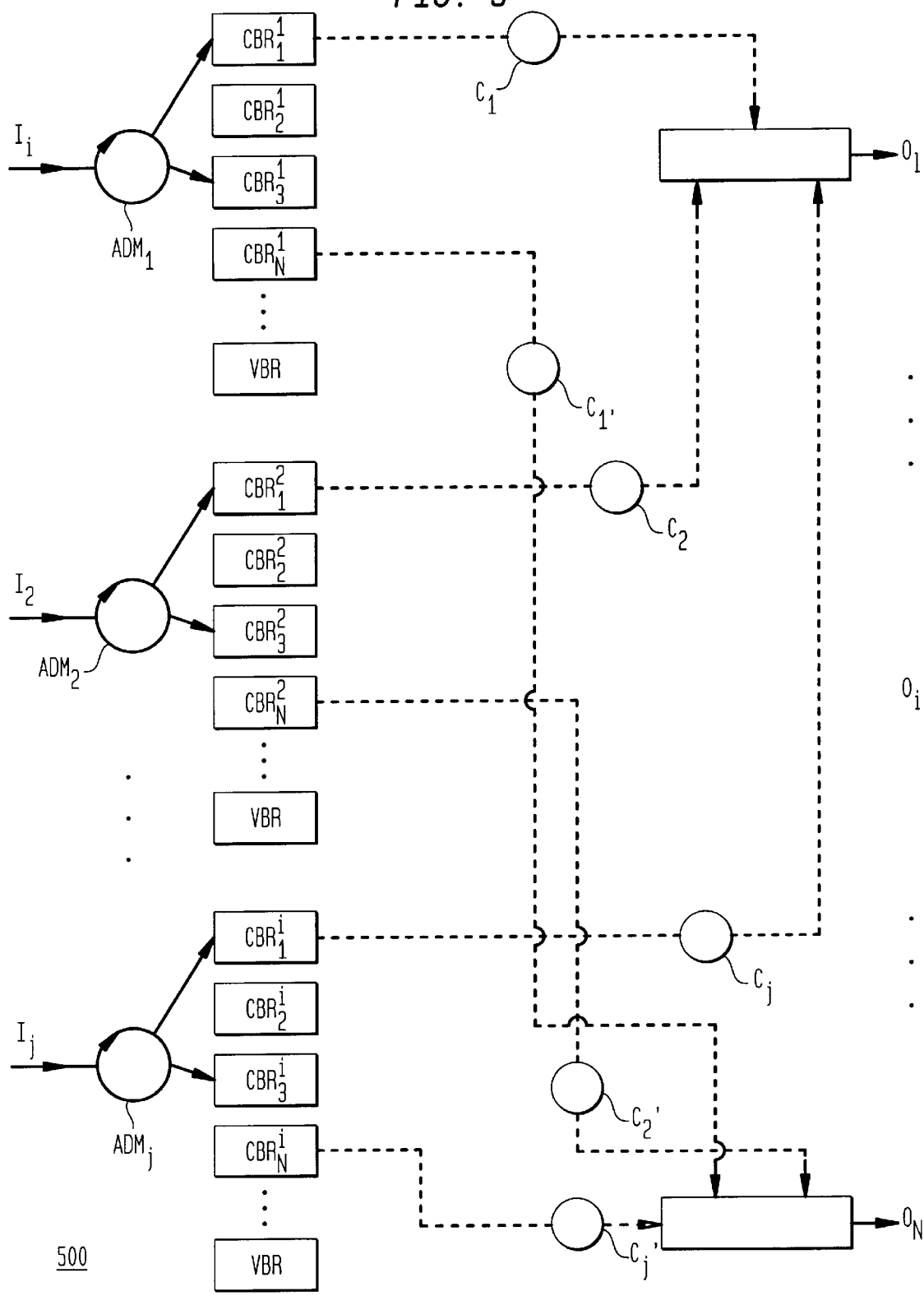
FIG. 5 is an operational view of an exemplary embodiment of a switching fabric in accordance with the present invention.

Referring now to FIG. 1 and FIG. 5, an operational description of the switching fabric of the present invention is now described. During call establishment of, for example, a CBR call, the switch processor determines if there is sufficient capacity on a path so as to allow establishment of a session between a source switch A and a destination source Z. A new call is accepted if the periodically updated information shows that capacity exists between source switch A and destination switch Z. For a particular output port $O_j$, the total bandwidth utilized is $BW_i \leq \Sigma_j CBR_i^j$. Total link capacity, along with the periodic updates of the bandwidth usage affecting the capacity, insures that no buffering other than that required for the 125 μsec times frames, is required by the switching fabric of the present invention. As described below, a call route is determined during call set up by the routing process. This call route may remain the same (or possibly change) during the call due to updated link bandwidth usage. A call will be blocked at the originating switch only after it has been determined that no capacity exists to handle the call. Once the call route has been established, switching fabric 500 transfers cells from an input side to an output side. Specifically, at the start of each 125 μsec frame, output port $O_i$ starts retrieving cells out of buffers $CBR_i^j$ in the order of j=1, 2, ..., N. In an exemplary embodiment, this is done in a round robin manner. As shown in FIG. 5, add/drop multiplexers $ADM_1$, $ADM_2$, and $ADM_j$, transfer cells from input ports $I_1$, $I_2$ and $I_j$ to associated buffers $CBR_N^j$, respectively. Controllers $C_1$, $C_2$ and $C_j$ then transfer the cells to their respective output ports $O_j$. As the cells are transferred from switch to switch, the CBR bursts are received in the same order as they were collected in CBR buffers from the input ports of the previous switch. As stated previously, this ensures jitterless switching, decreases the complexity of the switch fabric and addressing schemes and increases the overall speed and network performance.

As shown in FIGS. 2 and 5, a VBR buffer is associated with each input port. The VBR buffers are processed at the end or at the start of each 125 μsec time frame. The time slots for the VBR traffic are allocated based on availability. VBR traffic may be subject to cell loss and other Quality of Service measures. However, CBR traffic will not experience cell loss or delay jitter. In general, one VBR buffer per input port is sufficient and each cell of the VBR stream is processed individually. Note, that since most traffic is CBR, VBR processing is only a small percentage and does not consume large amounts of processing power as compared to processing both CBR and VBR traffic on an individual cell basis. Similar to CBR processing, a virtual path consisting of several VBR streams is set up when the source switch and destination switches are the same for those connections. The bandwidth wasted in the resulting CBR virtual path due to VBR fluctuations during multiplexing is minimal as compared to the tremendous efficiency in processing and overall network performance improvement. The ATM Forum type flow control information carried in Resource Management cells are used to periodically adjust the CBR bandwidth of several multiplexed VBR streams. Using the periodic update, the buffer for the VBR stream is checked and the CBR bandwidth for the group of multiplexed VBR streams adjusted. VBR traffic which is not a part of CBR virtual paths, may experience variable delays and jitter. These problems are accounted for by several available techniques, such as buffer sizing and bandwidth allocation, which insure the proper delay, jitter and cell loss requirements for the VBR traffic.

A routing method in accordance with the present invention is now described with reference to FIG. 1, and is used with the switching fabric detailed above. Upon the arrival of a call set up request, a set of route candidates are determined based on bandwidth availability, from which one call route is selected. These routes include the source switch A, the destination switch Z and may include intermediate switches $V_1, V_2, \ldots V_N$. Selection of the proper route is determined by first checking the capacity of the direct route, for example, link 155 and then the remaining links 110–145. This is done by calculating the following values:

$$BW_T^{min} = BW_T - (BW_{min} + BW_{CBR})$$

$$BW_T^{max} = BW_T - (BW_{max} + BW_{CBR})$$

where:

$BW_T$ is the total link capacity (which is represented by the number of slots on the ring associated with a particular input/output port);

$BW_{min}$ is the minimum BW represented by the total minimum rates allocated to VBR streams (for example ΣMCR);

$BW_{max}$ is the maximum BW represented by the total maximum rates allocated to VBR streams (for example ΣPCR);

$BW_{CBR}$ is the total CBR BW allocated at the port; and $BW_T^{Max}$, $BW_T^{Min}$ is the maximum and minimum BW available, respectively.

In accordance with the above equations and definitions, if the new call request is for a CBR call with a required capacity BW, then the call is routed on the link if $BW_T < BW_T^{max}$ on all the links comprising the route. If the new call request is for a VBR stream with a maximum bandwidth $BW_v^{min}$ and a minimum bandwidth $BW_v^{max}$, then route the call on the link if $BW_v^{min} < BW_v^{max}$. Using the above conditions, the direct link is first verified for available bandwidth. If sufficient capacity is available on the direct link, then the call is established using this route. If the direct link does not have sufficient bandwidth for this call, then the other routes are checked. As stated previously, the other routes may include one or more switches in a route between a source switch and a destination switch. All switches are checked for available bandwidth and included in the candidate set if sufficient capacity is available. Although these checks are initially performed at call set up, they are also performed at any time in order to dynamically adjust the call route in view of changing bandwidth availability.

Figure 6:
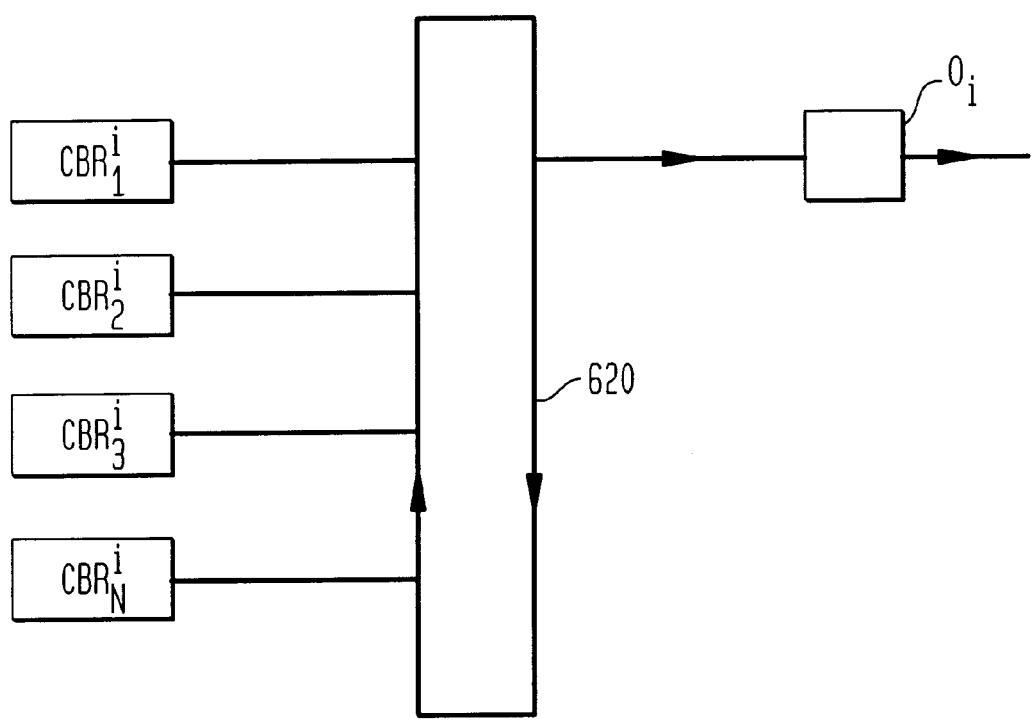
FIG. 6 is an exemplary embodiment of another switching fabric in accordance with the present invention.

Referring now to FIG. 6, there is illustrated another embodiment of a switching fabric 600 in accordance with the present invention. Switching fabric 400 has a set of $CBR_i^j$, where i=1, 2, ..., N, one for each input port $I_i$, an output port $O_j$, and a bus or ring 620 for each output port $O_j$. In this embodiment, each $CBR_i^j$ utilizes its own contiguous time slots as allocated during call set up. During a 125 μsec time frame, each $CBR_j^i$ deposits its contents on a set of contiguous slots on bus or ring 620 $I_i$, i=1, 2, ... N, in a round robin or similar manner, $O_j$, j=1, 2, ... N. Output port processor $O_j$ removes CBR bursts j, j=1, 2, ..., N contiguously in each 125 μsec time frame. In one embodiment, output port processor $O_j$ simultaneously transmits the cells on the output trunk of the switch. In an alternative embodiment, it can wait until the end of the 125 μsec time frame in order to receive all CBR bursts destined for the output port before transmission. Note that output port processor $O_j$ buffer size is determined for lossless switching in the same manner as for the input port buffers. Although not shown in FIG. 6, each input port also has at least one VBR buffer and possibly up to the number of output ports in the switching fabric. VBR traffic is handled in the same manner as CBR traffic, except that it is performed after CBR traffic processing and is dependent upon the available time slots in each 125 μsec time frame.

Although a single VBR buffer is shown in FIG. 2, in an alternate embodiment multiple VBR buffers are supported by the present invention switching fabric. For example, this may be the case when multiple priorities of VBR traffic is supported by the switching fabric. Moreover, the buffers associated with the CBR traffic at each input port do not have to be separate as illustrated in FIG. 2. All or a part of the buffers, could alternatively be implemented with a block of memory which has memory partitions for each CBR stream. In the exemplary embodiment output port processors or controllers 230–240 perform the activities of the switch processor of the present invention. In an alternative embodiment, the switch processor is associated with each input port $I_1$, $I_2$ to $I_N$ or it is a centralized switch processor or a combination of the above. Although the present invention is discussed with respect to the specified time frame of 125 μsec a, shorter or longer time frames are also implementable in the switching fabric. The size of the buffers and the speed of the add/drop multiplexers are easily adjustable to accommodate any alternate time frames or any transport medium.

As presented above, the present invention is a modular and reliable switching fabric structure for increasing network speed. This is evidenced by the fact, that by provisioning contiguous time slots in a time frame at call setup, and updating this information on a periodic basis to all other switches, a predictive approach for eliminating cell contention is created and as a result there is no cell loss. This structure and methodology also eliminates jitter, since all incoming cells for a specific call are designated for a specific set of contiguous time slots, which would travel along the same route. An added advantage is that this latter assignment policy results in a simple method for routing cell streams to the proper output ports. Such a switching fabric plays an important part in utilizing and developing greater bandwidth, and obtaining more reliable and faster networks.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A switching fabric which provides substantially jitterless and lossless transmission from a source switch to a destination switch in a network, comprising:

at least one switch processor for determining, in response to at least one call request, if capacity exists in a link to establish a route from said source switch to said destination switch, said at least one switch processor blocking said call when no bandwidth is available;

at least one buffer for holding data packets associated with said at least one call when bandwidth is available in said link, said at least one buffer coupled to said switch processor; and said at least one switch processor further operable to provision a required number of contiguous time slots in a specified frame when said bandwidth is available in said link, said processor further operable to route said data packets by counting said number of contiguous time slots provisioned to said data packets and cross-referencing said number of contiguous time slots to an output port and to switch said data packets in said given time frames.

2. The switching fabric according to claim 1, said at least one switch processor further operable to update said capacity determination on a periodic basis.

3. The switching fabric according to claim 2, wherein said periodic basis is at least as short as a call holding time.

4. The switching fabric according to claim 2, said at least one switch processor further operable to exchange said capacity determination on a periodic basis with other switches in a network.

5. The switching fabric according to claim 4, wherein said exchange is performed during a given time.

6. The switching fabric according to claim 5, wherein said exchange is performed during a call setup time.

7. The switching fabric according to claim 4, wherein a manner of said exchange is one selected from a group consisting of synchronous, asynchronous, distributed and centralized.

8. The switching fabric according to claim 4, said at least one switch processor further operable to internally route said data packets by pointing to a boundary of a group of contiguous time slots in a time frame.

9. The switching fabric according to claim 8, wherein said at least one buffer includes at least one constant bit rate buffer and wherein a size of said buffers holds a number of data packets receivable over a transport medium in given time frame.

10. The switching fabric according to claim 9, wherein said at least one buffer further includes at least one variable bit rate buffer.

11. The switching fabric according to claim 1 wherein said at least one switch processor further operable to note an endpoint time slot associated with said call.

12. The switching fabric according to claim 1, wherein said at least one switch processor is coupled to at least one input port and further coupled to at least one output port.

13. The switching fabric according to claim 12, wherein said at least one switch processor is integral with said input port.

14. The switching fabric according to claim 12, wherein said at least one witch processor is integral with said output port.

15. The switching fabric according to claim 12, wherein an add/drop multiplexer is coupled to said input port and said at least one buffer, said add/drop multiplexer operable to transfer said data packets within said given time frame from said at least one input port to said at least one output port.

16. The switching fabric according to claim 12, wherein a bus structure is coupled to said at least one buffer and to said output port.

17. The switching fabric according to claim 12, wherein a ring structure is coupled to said at least one buffer and to said output port.

18. The switching fabric according to claim 1, wherein said at least one switch processor determines said capacity for a constant bit rate call by using a fixed bandwidth value associated with said constant bit rate call.

19. The switching fabric according to claim 18, wherein said at least one switch processor determines said capacity for a variable bit rate call by using a bounding parameter selected from the group consisting of a peak rate and a minimum bandwidth.

20. The switching fabric according to claim 18, said at least one switch processor further operable to update said capacity determination on a periodic basis.

21. The switching fabric according to claim 18, said at least one switch processor further operable to exchange said capacity determination on a periodic basis with other switches in a network.

22. The switching fabric according to claim 18, said at least one switch processor further operable to internally route said data packets by referencing in a group manner a number of contiguous time slots allocated to said data packets associated with said call to an output port, and wherein said at least one switch processor switches said data packets in given time frames.

23. A method for providing substantially jitterless and lossless transmission from a source switch to a destination switch, said method comprising the steps of:
  determining a set of candidate routes, in response to at least one call request, by calculating link capacity between said source switch and said destination switch;
  comparing a required bandwidth of said call request with a maximum available bandwidth of a link to select a call route;
  selecting a direct link for said call route if said capacity of said direct link is available;
  selecting an alternate link for said call route if said direct link is unavailable and said alternate link has available bandwidth, said alternate link including at least one switch;
  blocking said call request when said required bandwidth is unavailable;
  updating said link capacity on a periodic basis at said source switch, said destination switch and other switches to permit dynamic changing of said call route during a call;
  assigning a contiguous set of time slots in a given time frame to accommodate said call request;
  internally routing data packets by cross-referencing a number of contiguous time slots assigned for said call request with an output port; and
  switching said data packets associated with said call request within said given time frame.

24. The method according to claim 23, further including the steps of:
  assigning a contiguous set of time slots in a given time frame to accommodate said call request; and
  buffering data packets associated with said call request contiguously in a buffer.

25. The method according to claim 24, wherein a size of said buffer is structured to hold a number of data packets receivable over a transport medium in said given time frame.

26. The method according to claim 24, wherein said buffer is a partitioned memory device for holding a number of data packets receivable over a transport medium.

27. A network including a switching fabric which provides substantially jitterless and lossless transmission from a source switch to a destination switch, comprising:
  at least one switch processor for determining, in response to at least one call request, if capacity exists in a link to establish a call route from said source switch to said destination switch, said at least one switch processor blocking said call request when said capacity is unavailable;
  at least one buffer for holding data packets associated with said at least one call when bandwidth is available in said link, said at least one buffer coupled to said at least one switch processor; and
  said at least one switch processor further operable to provision a required number of contiguous time slots in a given time frame and to route said data packets by cross-referencing said number of contiguous time slots provisioned to said data packets associated with said call an output port and switch said data packets in given time frames.

28. The network according to claim 27, said at least one switch processor further operable to update said capacity determination on a periodic basis and further operable to exchange said capacity determination on said periodic basis with other switches in said network.

29. The network according to claim 27, wherein said at least one buffer includes at least one constant bit rate buffer and wherein a size of said at least one buffer is structured to hold a number of data packets receivable over a transport medium in said given time frame.

30. The network according to claim 29, wherein said at least one buffer further includes at least one variable bit rate buffer.

31. The network according to claim 29, wherein said at least one switch processor is coupled to at least one input port and further coupled to at least one output port, and wherein said at least one switch processor is integral with one of said input port and said output port.

32. The network according to claim 27, wherein said at least one switch processor is a centralized processor.

33. The network according to claim 27, wherein said at least one switch processor is a distributed processor.

34. The network according to claim 27, further including at least one add/drop multiplexer for transferring said data packets in said given time frame.

35. A switching fabric for providing substantially jitterless and lossless switching of data packets, comprising;
  at least one switch processor for determining bandwidth availability by checking periodically updated bandwidth availability from other switches in response to a call request, said at least one switch processor rejecting said call request when a required bandwidth is unavailable;
  said at least one switch processor assigning contiguous time slots in a given time frame to said data packets when said required bandwidth is available;
  at least one input unit for processing said data packets when said required bandwidth is available wherein said input unit includes at least one buffer for holding said data packets, said buffer sized to hold a number of data packets corresponding to said given time frame and a speed of a transport medium; and
  at least one output unit for receiving processed data packets from said at least one input unit and transmitting said processed data packets to a next switch.

36. The switching fabric according to claim 35, wherein said at least one input unit includes at least one add/drop multiplexer for transferring said data packets.

* * * * *